Sept. 6, 1955  H. G. TASKER ET AL  2,717,377
AUTOMATIC AMPLITUDE CANCELLATION IN MOVING TARGET INDICATOR
Filed Feb. 21, 1951  5 Sheets-Sheet 5

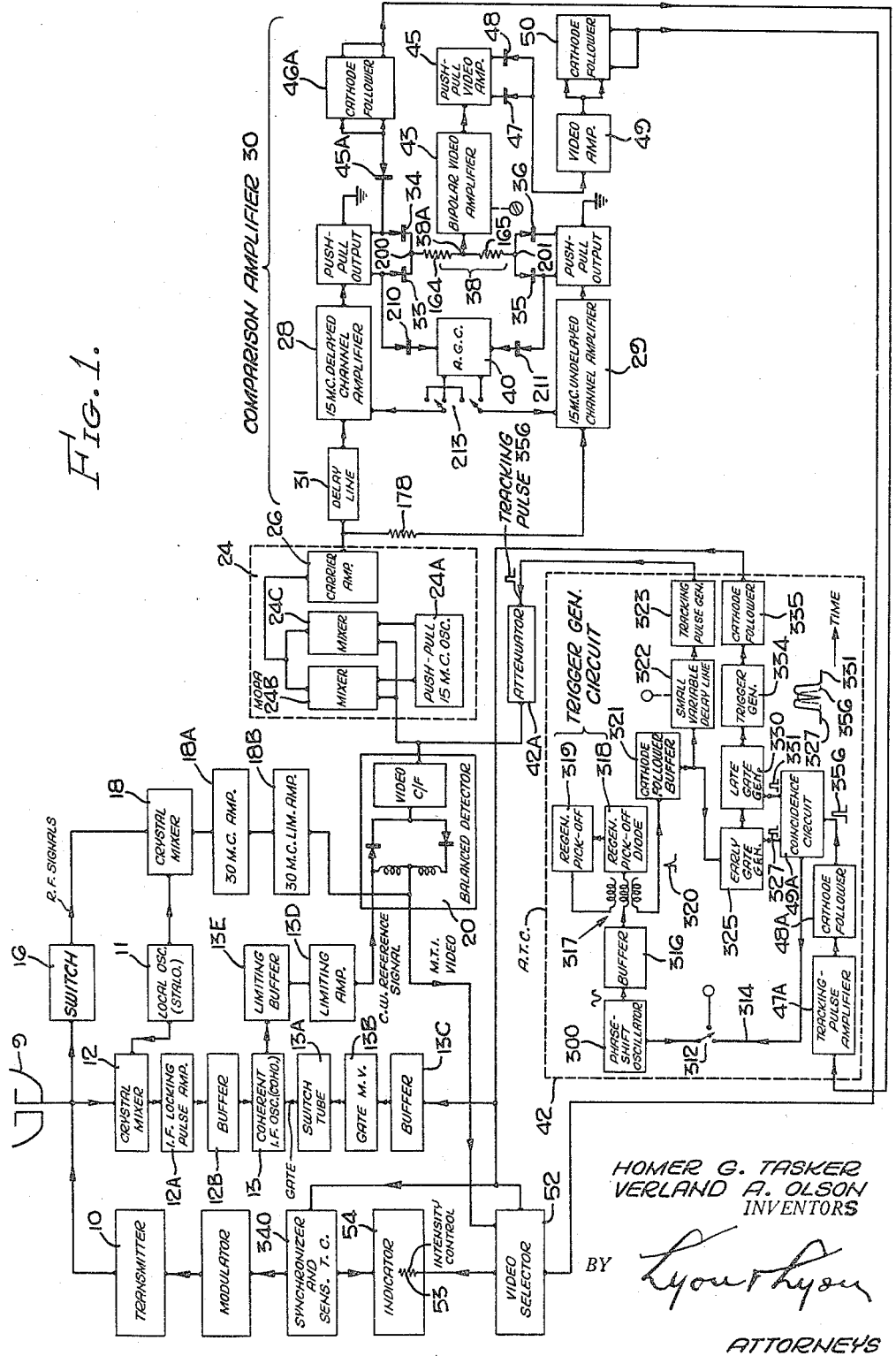

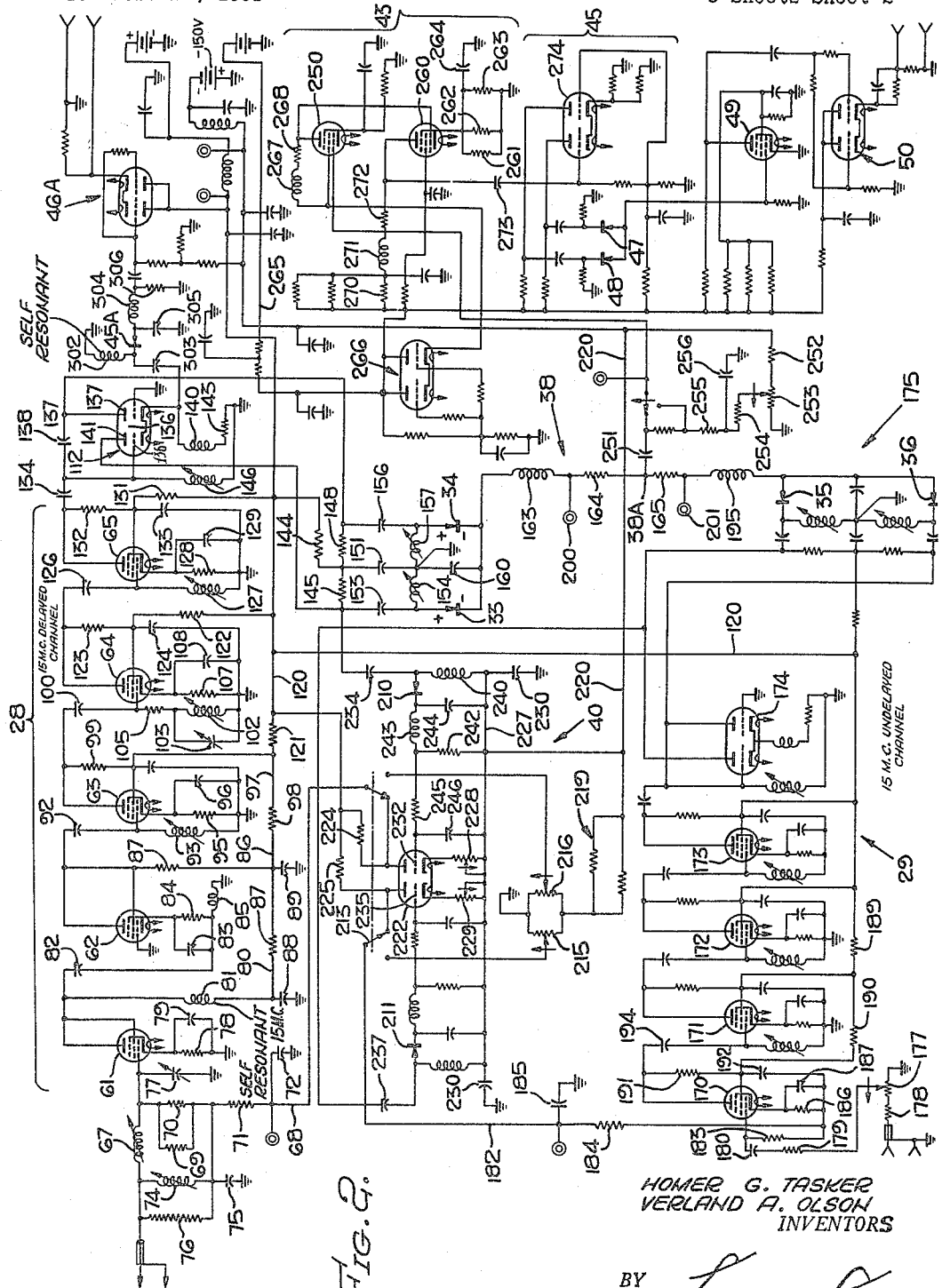

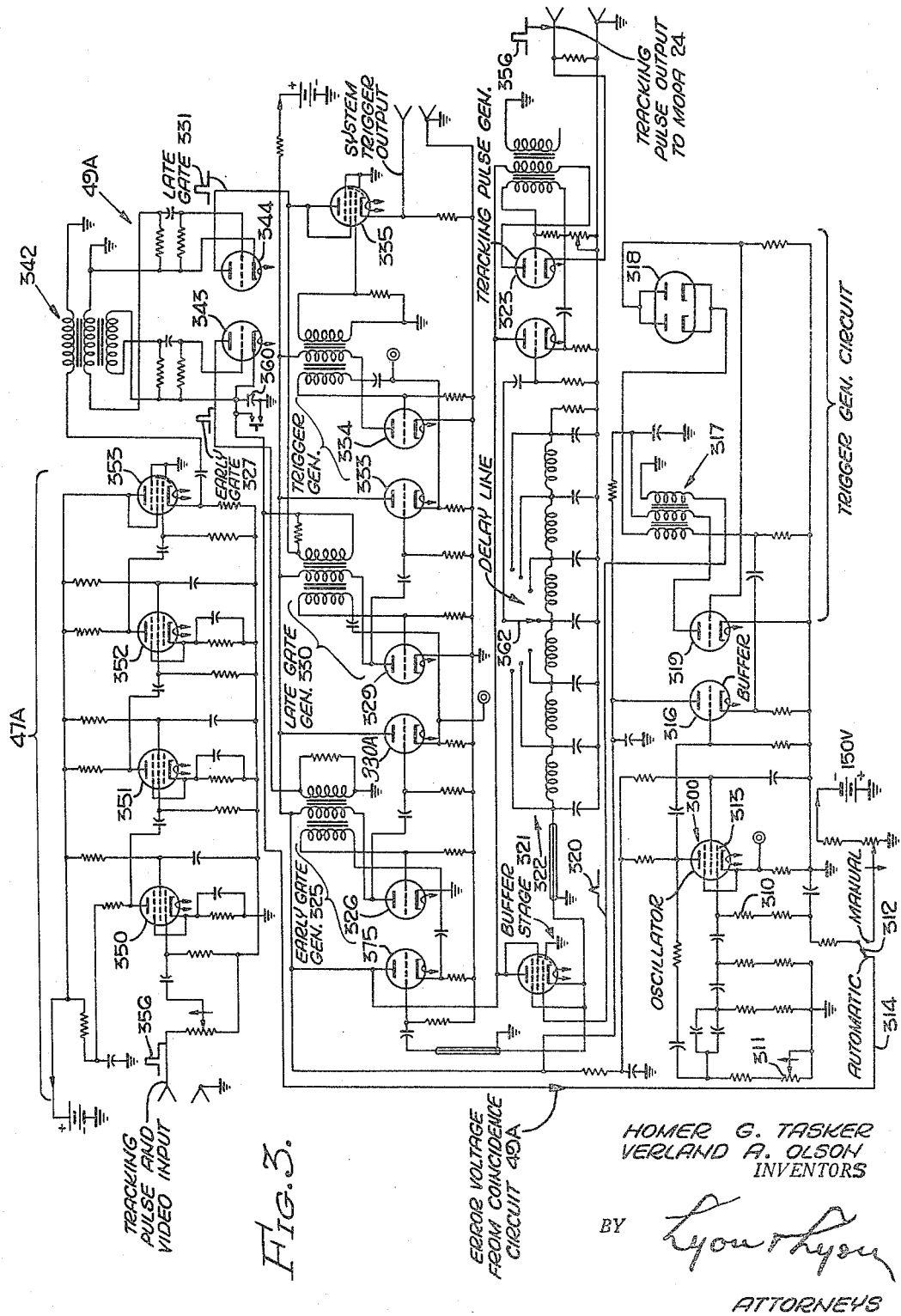

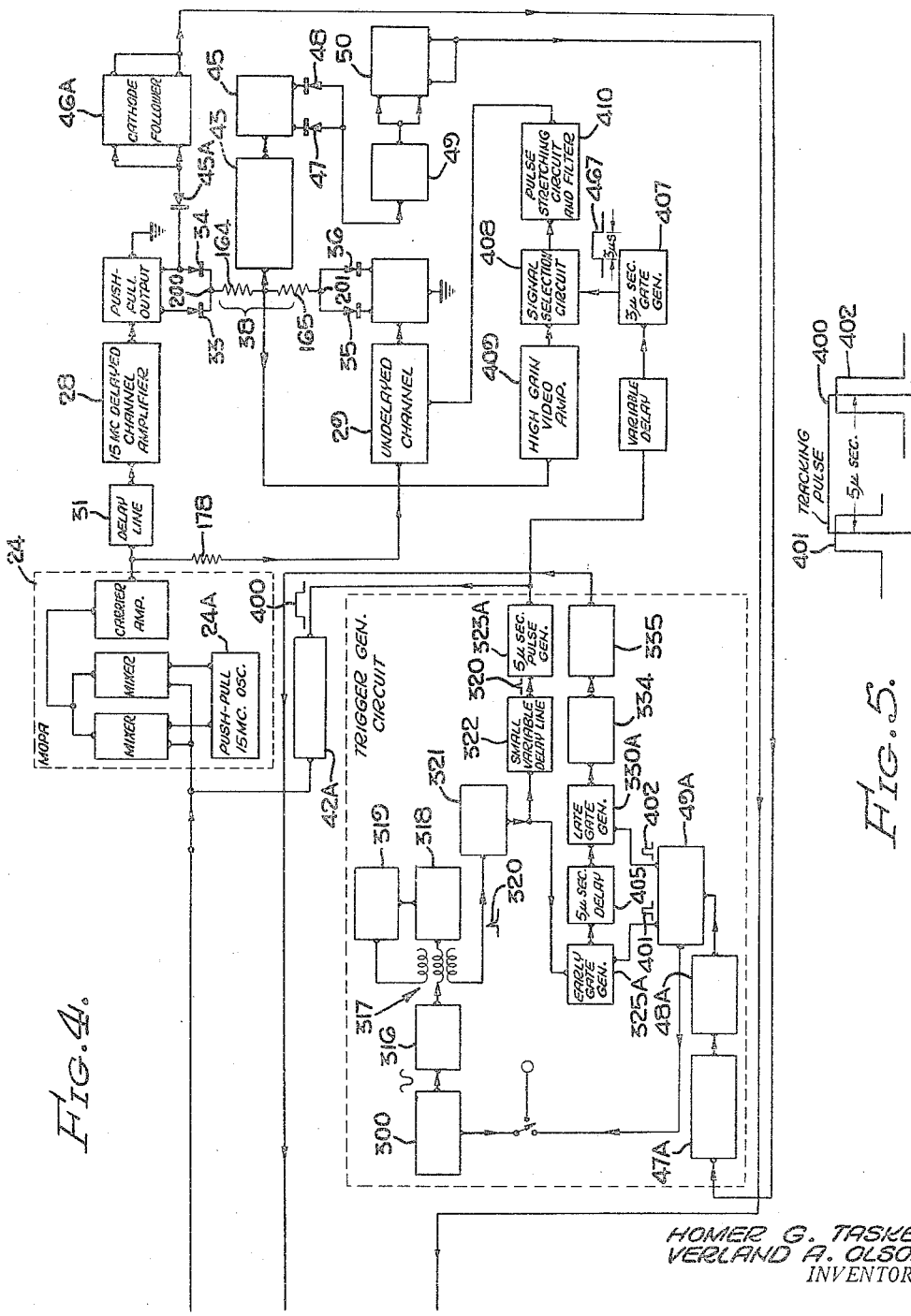

HOMER G. TASKER
VERLAND A. OLSON
INVENTORS

BY Lyon & Lyon
ATTORNEYS

United States Patent Office 2,717,377
Patented Sept. 6, 1955

2,717,377

AUTOMATIC AMPLITUDE CANCELLATION IN MOVING TARGET INDICATOR

Homer G. Tasker, Van Nuys, and Verland A. Olson, Canoga Park, Calif., assignors to Gilfillan Bros., Inc., Los Angeles, Calif., a corporation of California Application February 21, 1951, Serial No. 212,146

13 Claims. (Cl. 343—7.7)

The present invention relates to improvements in radar sets generally and more specifically to improvements in moving target indicating (M. T. I.) systems.

In ground controlled approach (G. C. A.) radar sets the technique necessarily involves detection of low flying aircraft. Unless the radar set is very carefully sited, an approaching aircraft may be obscured by echoes from stationary objects at the same range. The aircraft may be confused with a multiplicity of irrelevant targets, during a period when the time element is all important. There are occasions when it is impossible to site the radar in such a way as to eliminate this problem.

The addition of moving target indicating (M. T. I.) systems allows a scope presentation or a remote control presentation sensitive only to moving targets. This eliminates the above siteing problem since ground, tree and building targets do not then appear on the scopes and/or their presence does not affect the remote control arrangement. Approaching planes may be seen though they are in the midst of what otherwise manifests itself as so-called ground clutter.

The detection of a moving object, in accordance with the system shown herein, depends upon change of the phase of the radio frequency echo from the object. Whereas with earlier radar sets, only amplitude changes could be observed, the advent of "coherent pulse" techniques makes possible the observation of phase change between a transmitted pulse and a received pulse.

The problem of discriminating against spurious phase change in systems of this type is important and in order to achieve a satisfactorily operating system, cognizance must be taken of the fact that amplitude change frequently implies phase change of the same order of magnitude and vice versa.

It is an object of the present invention to provide an improved moving target indicating system which has general application in all types of radar systems and is particularly useful in the so-called precision section of a ground controlled approach (G. C. A.) landing system wherein the pilot of a plane may be "talked" down or his plane automatically operated in accordance with indications or voltage variations produced in the radar set located adjacent the landing strip.

Another object of the present invention is to provide an improved moving target indicating system of the type in which observed moving objects are differentiated from stationary objects by the phase difference in reflected waves from a moving target, and the absence of phase differences in reflected waves of a stationary target, and in which the resulting phase variations produced by a moving target are converted into amplitude variations, the present improved system being characterized by the fact that differences in amplitude of the received signals, applied to different channels, are compensated in such a manner that indications are produced only in accordance with phase variations and undesired amplitude variations in the system are balanced out to have substantially no effect on the indicator.

Another object of the present invention is to provide an improved moving target indicating system of the type in which moving targets are discerned by phase changes and these phase changes are converted into amplitude variations, a characterizing feature of the present improved system being that amplitude variations in the system are compensated or balanced so that the ultimate amplitude variations in the indicating system truly represent the position of a moving target.

Still another object of the present invention is to provide an improved moving target indicating system including an automatic temporal control (A. T. C.) and an automatic gain control cooperating together so that the ultimate amplitude variations in the indicating system truly represent the position of a moving target.

Still another object of the present invention is to provide an improved radar set including a moving target indicating system which comprises an undelayed channel, a delayed channel associated with an automatic temporal control serving to control the operation of the transmitter portion of the set, and an automatic gain control also cooperating with such delayed channel and said automatic temporal control so that the resulting signals in either an indicator or a remote control system derived from echoes may truly represent the position of a moving target.

The features of the present invention which are believed to be novel are set forth with particularity in the appended claims. This invention itself, both as to its organization and manner of operation, together with further objects and advantages thereof, may be best understood by reference to the following description taken in conjunction with the accompanying drawings in which:

Figure 1 is a schematic block diagram of a radar system embodying the present invention.

Figure 2 shows in more detailed form the comparison amplifier embodying features of the present invention in the system shown in Figure 1.

Figure 3 shows in more detailed form the automatic temporal control shown in the system in Figure 1 which cooperates with the circuit shown in Figure 2 to produce new results forming the basis of certain features of the present invention.

Figure 4 shows a modified circuit arrangement utilizing an elongated tracking pulse produced in the automatic temporal cancellation unit for obtaining automatic amplitude cancellation.

Figure 5 represents the elongated tracking pulse in relationship to the early and late gates, all formed in the modified arrangement shown in Figure 4.

Figure 6:
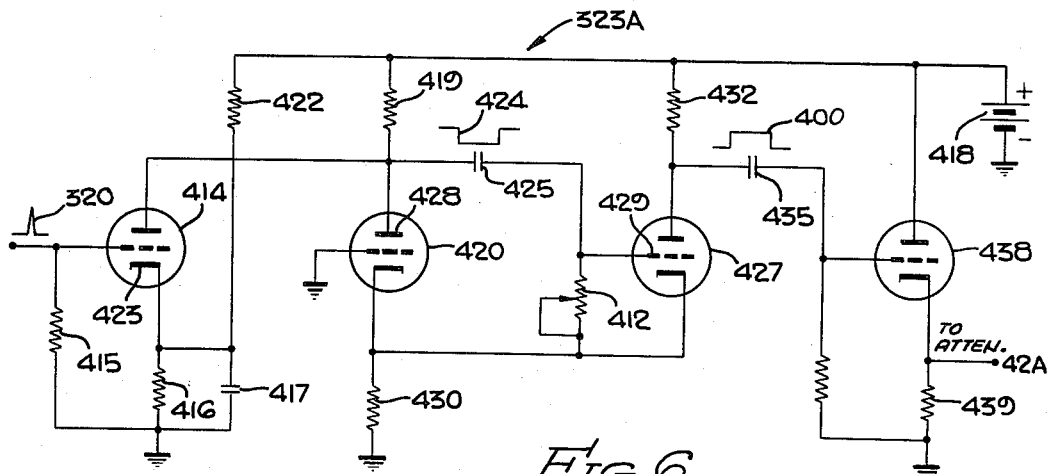
Figure 7:
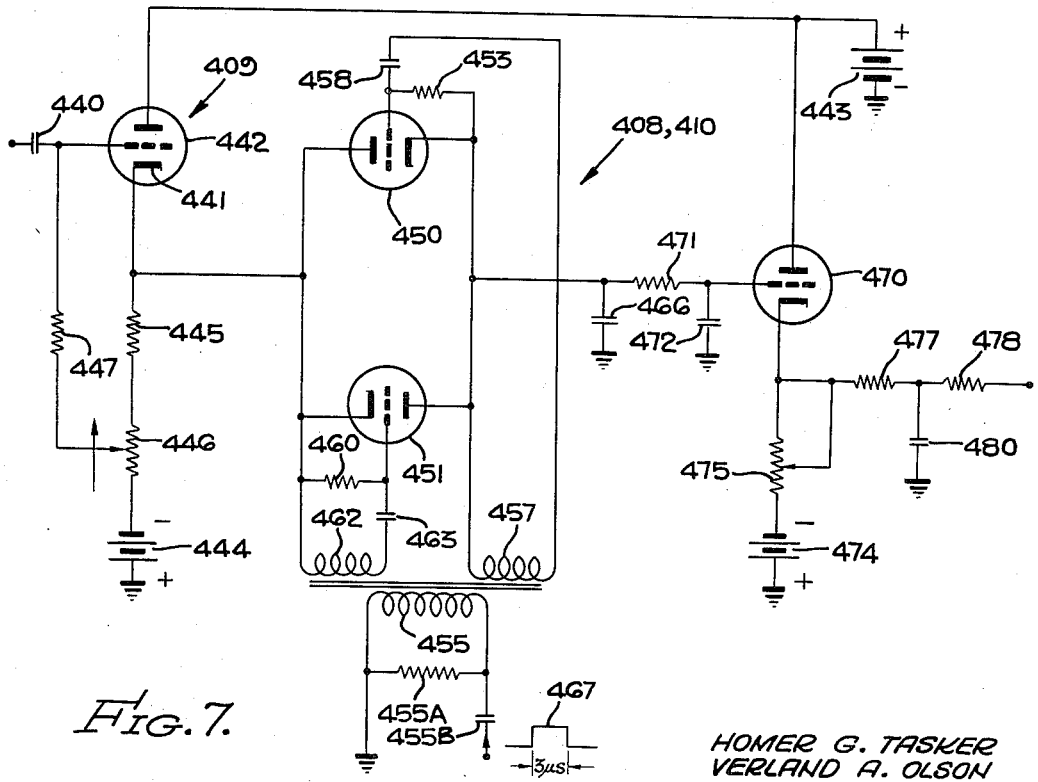

Figures 6 and 7 show in detailed form some of the circuitry illustrated in Figure 4, Figure 6 showing details of the 5-microsecond pulse generator in Figure 4 which is substituted for the corresponding 1-microsecond pulse generator 323, and Figure 7 showing details of the signal selection and pulse stretching circuits shown in block form in Figure 4.

Effectiveness of a radar set depends largely on how well the "blip" representing the target of interest may either be seen on the screen of the indicator or corresponding voltage variations may be used to, in turn, control the flight of the target. Since the reflection from all objects, whether stationary or moving, result normally in echo-indications either on the screen, where an indicating screen is used, or in voltage or current variations in a remote control system for controlling a target, the target of particular interest may be obscured by the echoes of stationary objects such as buildings, trees, chimneys, etc., to the extent that the usefulness of the radar set may be seriously impaired. This is especially true of the region near the radar set, in G. C. A. systems, where ground clutter is relatively predominant at close range.

In order to accomplish the discrimination between fixed and moving targets, the radar set described herein is made sensitive to a change of the phase angle of a return pulse or echo as compared with the phase of the transmitted pulse, using the Doppler effect to distinguish moving targets from stationary objects although certain features of the present invention are applicable likewise to other types of moving target indicating systems. This phase sensitivity is obtained by adding a returning echo signal at intermediate frequency to a phase coherent continuous wave, CW, oscillation of the same nominal freqency. The change of phase angle from pulse to pulse of the energy reflected from moving targets is readily detectable and makes possible an M. T. I. system which is highly sensitive to objects having a wide range of velocities. The so-called coherent pulse Doppler system shown herein employs phase locking between the pulsed transmitter and a continuous wave oscillator as is described in more detail hereinafter.

Briefly, the phase variations of moving target echoes are converted into amplitude variation by a process known as "phase detection." The echo train from each outgoing pulse is "stored" in a first channel including a delay line for an exact repetition interval. This stored echo train is compared with the echo train of the succeeding pulse applied to a second channel. In order to make a true comparison, there is associated with each one of said channels a compensating or gain control network in accordance with an important feature of the present invention. In making such comparison, any echo which occurs with no change of amplitude is discarded since it comes from a fixed or stationary target while any echo which recurs with changed amplitude is either presented on the indicator or may be used to effect remote control, since it comes from a moving target.

It was previously stated that the echo return from a moving target changes its phase relative to the radar transmitter from pulse to pulse. The term "phase relative to the transmitter" may be considered in light of the following statement: If the transmitter were to continue oscillating after the main pulse, the point in the R. F. or radio frequency cycle reached by the transmitter pulse at the instant the resulting echo pulse returns would determine the phase relationship between the transmitted and echo reflected pulses.

Referring to the drawings, a pulse from radar transmitter 10 is applied to the antenna 9 and simultaneously to the crystal mixer stage 12. The pulse applied to stage 12 is first converted to an intermediate frequency of 30 megacycles by beating with oscillations from a local oscillator 11 applied to the crystal mixer 12, termed also the "locking pulse mixer," and the resulting I. F. or intermediate frequency "locking pulse" produced by superheterodyne action is used to control the phase of an oscillator 13 at the intermediate frequency. This oscillator 13 is then used as the phase reference instead of the transmitter itself. Thus, the oscillator, stage 13, acts as a phase reference for the intermediate frequency signals and is locked in phase or is made coherent at the time of each transmitted pulse.

The output of the locking pulse mixer 12 is amplified by a three stage locking pulse amplifier 12A. The output of this locking pulse amplifier 12A is used to drive a class C buffer stage 12B which is biased to cut off to produce a circuit independent of signals below a predetermined level of the locking pulse. The buffer stage 12B is used to excite a high Q tank or frequency determining circuit in the oscillator stage 13 which is a modified Hartley oscillator, of resonant frequency 30 megacycles. Stage 13 is hereafter termed the COHerent Oscillator or COHO because its oscillations are locked in phase or made coherent with the phase of the intermediate frequency oscillations derived from the pulse of transmitter 10 in mixer 12.

The COHO oscillator stage 13 is arranged in such a way that the oscillator can be turned on and off by a video gating pulse from switch tube 13A caused by the automatic temporal control (A. T. C.) described hereinafter. In other words, to facilitate the locking process, the oscillator stage 13 is switched off for a short time before the arrival of the locking pulse. While COHO is thus turned off by such video gating pulse, the locking pulse from buffer stage 12B is applied to the tank or frequency determining circuit of COHO to produce forced oscillations therein. Oscillations will continue in this high Q tank circuit for several microseconds after the locking pulse has been removed and the oscillator 13, when it starts up again, has the phase of such forced oscillations.

To summarize this step: COHO is interrupted before each transmitted pulse and is started and locked in phase with the intermediate frequency pulse derived from the transmitted radio frequency pulse. The object of this operation is to preserve the same phase difference on successive pulses between COHO and the intermediate frequency signal from a given fixed target. The phase difference will be the same if the target does not move and if the frequency of COHO and the local oscillation 11 remains substantially constant.

At the time the "locking" pulse is applied to COHO 13, it is in a switched-off condition by the conduction connected to the switch tube 13A in the COHO gate multivibrator 13B, rendering the grid in the COHO oscillator stage 13 to a sufficiently negative value to achieve the purpose. Approximately, one microsecond after the beginning of the locking pulse which if duration longer than one microsecond, the COHO stage 13 is switched back on and produces oscillations in phase with the oscillations comprising the locking pulse. This switching on and switching off of COHO in timed relationship with the locking pulses insures that the COHO continuous wave output will be coherent, that is, that it will be locked in phase with the phase of the I. F. signal resulting from the transmitted pulse.

The output of COHO 13 is passed through two limiting amplifiers 13E and 13D which limit the signal from COHO to a value comparable to the value of the echo signal applied likewise to a balanced detector 20 from the mixer 18.

Echo pulses received on antenna 9 and passed by the TR box 16 are converted in mixer 18 to the intermediate frequency of 30 megacycles by superheterodyne action for comparison with the CW reference signal derived from the amplified output of COHO 13 in a conventional balanced phase detection circuit 20 forming a portion of the so-called M. T. I. receiving unit which is preferably of the limiting type incorporating an amplifying stage 18A and limiting amplifier 18B, although it likewise may be of the so-called lin-log type, or of the I. A. G. C. type.

For satisfactory phase detection at the intermediate frequency level of 30 megacycles, the same local oscillator 11 is used in the conversion of the R. F. locking pulse and the conversion of the echo pulse to the same intermediate frequency. Furthermore, it is desirable that this local oscillator 11 be extremely stable in frequency. The M. T. I. local oscillator 11 is known as the STAbilized Local Oscillator—STALO. It may include a McNally klystron tube stabilized by an "S-band" echo box used as a cavity resonator.

Since the same local oscillator, STALO, feeds both the signal mixer and the locking pulse mixer, its phase at the time of the transmitted pulse affects equally both the continuous wave reference I. F. signal and the radar pulse echo I. F. signal. Hence, the sparking phases of the transmitter and the local oscillator cancel out when the I. F. echo signal and the I. F. reference signal beat against each other in detector 20. Therefore, the phase of the output of detector 20 depends only on the range or the number of cycles executed by the local oscillator and by the coherent oscillator during the echo time.

When the target is moving, its range changes from pulse to pulse and a fluctuating output signal results from the corresponding change in the phases traversed by the oscillators during the echo time.

The M. T. I. receiver including the 30 megacycle amplifier 18A and the 30 megacycle limiting amplifier 18B amplifies and limits the intensity of the I. F. echo or return signal with a predetermined gain vs. amplitude characteristic, and in the balanced detector 20 thereof compares the phase of these echo or return signals with the previously mentioned signals of like limited magnitude from reference oscillator, COHO, and then converts the resulting phase difference to a corresponding amplitude variation.

Once the phase variations have been converted into amplitude variations by the phase detection circuit 20 in the receiver, the resulting phase coherent video is used to modulate a 15 megacycle carrier produced in the Master Oscillator-Power Amplifier—MOPA 24. The echo train on this carrier after amplification in amplifier 26 is sent along two different channels 28, 29 in a comparison amplifier 30, one of which channels includes the delay line 31.

The function of the comparison amplifier is to compare the delayed phase coherent video from the delay line 31 with the undelayed phase coherent video, in such a manner as to cancel all echoes except those whose R. F. phase has shifted between pulses in accordance with the Doppler principle.

These carriers leaving the output of such channels 28, 29 are demodulated respectively by crystal detectors 33, 34 on the one hand and crystal detectors 35, 36 on the other hand, after which the video envelopes are compared in the subtraction circuit 38.

The subtraction circuit 38 is known also as the cancellation network, and is so arranged that only the echoes whose amplitudes vary from pulse to pulse produce a difference or resultant signal. Such a resultant signal is referred to as M. T. I. cancelled video.

Moving targets are distinguishable from stationary targets because their phase variations are converted into amplitude variations. The character of these amplitude variations is preserved and no extraneous ones introduced when they pass through the two different channels 28, 29 by a compensating network 40 or automatic gain control embodying important features of the present invention.

Since the resultant signal appearing in the cancellation network 38 is representative of a moving target, it is both positive and negative and thus is bipolar in nature. The bipolar signal is amplified in the bipolar video amplifier 43 and the push pull stage 45, detected in crystal rectifiers 47, 48, after which the modulation components are successively applied to video amplifier stage 49, cathode follower stage 50 and video selector unit 52 before being applied to the intensity control grid 53 in a cathode ray tube forming a component of the indicator 54. Alternatively or conjointly instead of being applied to the intensity control grid 53, the video may be applied and used in a remote control system of the type shown, described and claimed in the copending patent application of Coy M. Byerly, Serial No. 196,310, which application is assigned to the same assignee as is the present application.

The delay means in the M. T. I. system shown herein consists of means necessary for making a temporal (time) delay in any given video train so as to permit comparison with the succeeding video train and cancellation of "fixed" phase signals in the cancellation network 38. The comparison function implies the need for exact temporal cancellation, and hence the delay system includes circuits for making the delay interval equal to the repetition interval between pulses transmitted from transmitter 10. The circuit for accomplishing this function includes as elements thereof the master oscillator - power amplifier (MOPA) 24, the supersonic delay line 31, and the automatic-temporal-cancellation (A. T. C.) unit 42.

The function of the delay line 31 is to delay the phase coherent signal train delivered to it from MOPA 24 for the time interval between each transmitted pulse. The delay line 31 is, per se, conventional and may consist of a column of mercury of 0.375-inch diameter, with a quartz crystal at both ends, all confined by a stainless steel tube.

The video-modulated 15-megacycle carrier signal from MOPA 24 is impressed on the transmitting crystal in the delay line 31, which crystal responds with mechanical vibrations of the same frequency, setting up acoustical waves in the mercury. This crystal has a resonant frequency approximately equal to the carrier frequency, but the damping caused by the intimate contact with the mercury is sufficient to make the resulting resonance curve of the crystal very broad.

The length of the mercury column in delay line 31 may be approximately 57 inches, so as to give a delay interval of 1,000 micro-seconds, based on the velocity of acoustical waves in the mercury at 20 degrees centigrade. The attenuation suffered by the supersonic signals in the line is high—approximately 70 to 80 db when the delay line 31 is terminated in an impedance of 75 ohms.

As mentioned above, video signals in the ouput circuit of the balanced detector 20 of the M. T. I. receiver, are phase-coherent or phase locked video signals, bipolar in nature. These video signals are not applied directly to the supersonic delay line 31 because they would be seriously distorted. Hence it is desirable to modulate an R. F. carrier with the video signals and send this carrier through the delay line. This is the function of MOPA. MOPA accomplishes the function of generating a carrier in oscillator stage 24A, modulating it with video in balanced mixers 24B, 24C, and driving the delay line 31 after the modulated carrier is amplified in stage 26.

The characteristics of the "delayed" carrier channel 28 are similar to those of 15 megacycle I. F. strip in a radar receiver. This circuit is designed to amplify with negligible distortion, the signals from the output of delay line 31 so that they will be of suitable amplitude when detected.

The "undelayed" channel 29 takes signals directly from MOPA 24, attentuates them to a level comparable to the delayed input signal level, amplifies them through a 15-mc. amplifier comprising a plurality of stages similar to the stages in the "delayed" channel 28, and detects them in a push-pull detector including crystals 35, 36 identical with that in the delayed channel 28.

To ensure efficient and accurate automatic temporal cancellation, it is preferred to produce a tracking or timing pulse in the automatic temporal control unit 42 and to introduce the same into the input circuit of MOPA 24 and through the signal delay line 31. This may be done without upsetting cable terminations and without the necessity of introducing an additional tube by passing such tracking pulse through a resistive attenuator network 42A. This is possible because the tracking pulse at the output of the Temporal Cancellation Unit 42 is much larger than may be desirably introduced directly into the balanced modulator circuit in MOPA 24. The tracking pulse applied from the Automatic Temporal Control Unit 42 travels the following path: from A. T. C. 42, through attenuator 42A, through MOPA 24 wherein it modulates the carrier generated therein, through the delay line 31, through the "delayed" channel 28, through the crystal detector 45A wherein the pulse is separated from its carrier, through the cathode follower stage 46A and then back to the A. T. C. unit 42.

Such tracking pulse, in its passage through such circuit, should preferably not be subject to the back-biasing of the crystals which feed the automatic amplitude balance circuit in the Comparison Amplifier.

Such tracking pulse, as it enters the A. T. C. unit 42, is first amplified in stage 47A and then applied through cathode follower stage 48A to a coincidence circuit 49A wherein an early gate voltage and a late gate voltage co-act with such tracking pulse voltage for achieving the desired result in a manner described in detail hereinafter in connection with the description of Figure 3.

As shown in Figure 2, the delayed channel amplifier 28 includes five stages comprising electron discharge devices 61, 62, 63, 64 and 65. Each stage is tuned broadly to 15 megacycles. Since the attenuation in delay line 31 is large, the output voltage of the delay line is usually not very much greater in amplitude than the noise generated in the input stage of the delayed channel amplifier 28 or in the input circuit for device 61. In order to prevent impairment of the signal to noise ratio as measured in such input circuit, two precautions are taken as follows:

(1) The efficiency of the coupling between the delay line 31 and the input circuit for amplifier 28 is made as high as possible in order to maximize the amplitude of signals in the input circuit of the first stage 61; high efficiency of coupling being obtained by placing the amplifier unit 28 as close as possible to the delay line output terminals, by minimizing stray capacitance and by using a double tuned circuit to also preserve wide-band pass characteristics.

(2) A low noise input circuit including discharge device 61, 62 is used to minimize the noise generated in the input stage. The low noise input circuit consists of two RCA type 6AK5 tubes, triode connected, the triode connection being favored because of the lower inherent noise features obtainable. The load impedance presented to the first stage is very low, consisting only of the cathode-to-plate impedance of the second stage 62. This low impedance makes neutralization unnecessary.

The second stage 62 is operated as a grounded grid triode with the input voltage from stage 61 applied to the cathode of device 62. Operated thus, tube 62 furnishes a low plate impedance for device 61. Although the plate current of tube 62 has the same noisy nature as that of tube 61, the noise suffers almost complete degeneration since its path is through the high impedance represented by the dynamic plate resistance of tube 61.

Specifically, the ungrounded terminal of the two-terminal output circuit from the delay line 31 is connected to the grid of device 61 through a variable inductance 67. The grid of device 61 is also connected to the delayed channel bias voltage lead 68 through a pair of parallel connected resistances 69, 70 and an isolating resistance 71, the line 68 being grounded through condenser 72 for high frequency signals. Also, the junction point of one terminal of inductance 67 and the connected output terminal of the delay line is connected to ground through a serial circuit comprising a variable inductance 74 and a condenser 75, the inductance 74 being shunted by a resistance 76. The grid circuit for device 61 may be tuned by the variable condenser 77 which is connected between the grid of device 61 and ground.

The cathode of device 61 is connected to ground through a shunt connected cathode bias arrangement comprising resistance 78 and condenser 79.

The anode of device 61 receives space current from the positive anode lead 80 through coil 81 self-resonant at 15 megacycles. Also, the anode of device 61 is coupled to the cathode of device 62 through coupling condenser 82 and the shunt connected bias arrangement comprising condenser 83 and resistance 84, the junction point of condenser 82 with such bias arrangement being grounded for direct current through the high frequency choke coil 85.

The anode of device 62 receives its space current from the high potential lead 86 which is connected to the anode of device 62 through the voltage dropping resistance 87. Lead 86 is connected to lead 80 through voltage dropping resistance 87, leads 80 and 86 being grounded for high frequency voltages through the bypass condensers 88, 89.

Output voltages appearing at the anode of device 62 is applied to the control grid of device 63 through the coupling condenser 92, the grid of device 63 being connected to ground through the tunable coil 93 which may be tuned to be self-resonant at 15 megacycles. The cathode of device 63 is grounded through the condenser resistance bias arrangement comprising shunt connected resistance 95 and condenser 96.

Space current for device 63 is supplied from the high voltage lead 97, the lead 97 being connected to lead 86 through voltage dropping resistance 98 and being directly connected to the screen of the 6AK5 discharge device 63 and also being connected to its anode through resistance 99. The anode of device 63 is coupled to the control grid of device 64 through coupling condenser 100.

The amplitude-frequency response of the mercury delay line 31 is not flat. In fact, the amplitude response of the delay line 31 decreases continuously with increasing frequency. Therefore, it is desirable to introduce in the coupling circuit between the stages 63 and 64 of the delay channel amplifier 28 a compensating network. This compensating network consisting of variable inductance coil 102, shunt connected with a variable condenser 103, has a gain characteristic of the same shape as the attenuation characteristic of the delay line 31, thus making the overall response of the line and the amplifier substantially flat for the frequency band of interest. This compensating network 102, 103, comprising a single tuned circuit, has its ungrounded terminal connected to the control grid of device 64 through resistance 105. The cathode of device 64 is grounded through a resistance condenser biasing arrangement comprising resistance 107 and shunt condenser 108.

The compensation introduced by the network 102, 103 is obtained by adjusting the grid circuit of device 64 to a frequency F' higher than the carrier frequency F. The frequency F' and the Q of such grid circuit are such that a gain characteristic is produced which is complementary of the attenuation characteristic of the delay line 31 in a range of frequencies above the frequency F.

Space current for device 64 is applied from high voltage lead 120 which is connected to lead 97 through resistance 121 and which is connected to the anode of device 64 through the serially connected resistances 122, 123, the junction point of resistance 122, 123 being connected to the screen grid of device 64 and being substantially connected to ground for high frequency voltages through the bypass condenser 124.

Amplified voltages appearing on the anode of device 64 are coupled to the grid circuit of device 65 through coupling condenser 126, such grid being connected to ground through the variable coil 127 which may be tuned to be self-resonant at 15 megacycles. The cathode of device 65 is connected to ground through a condenser resistance biasing arrangement comprising shunt connected resistance 128 and condenser 129.

Space current for device 65 is obtained from the high voltage lead 120 which is connected to the anode of device 65 through the serially connected resistance 131, 132, the junction point of resistance 131, 132 being connected to the screen grid of device 65 and being grounded for high frequency voltages through the bypass condenser 133.

After amplification in the five stages 61, 62, 63, 64 and 65, the resulting amplified voltage is applied to a phase splitting stage 112, including an RCA type 6J6 discharge device. This phase-splitting stage 112 drives a full-wave detector which includes two germanium crystals 33, 34. Full wave detection is used because of its greater fidelity to the modulation envelope. The amplification preceding detection is sufficient to ensure that, for all signals of interest, the crystals will rectify in the linear region of its characteristic.

After the signal is rectified, it is applied to a cancellation network 38 to which also is applied amplitude detected signals from the 15 megacycle undelayed channel 29.

Specifically, the amplified voltage appearing on the anode of device 65 is applied to the control grid 136 of the phase splitting stage through coupling condenser 134. The grid 136 is connected to ground through the variable self-resonant tuning coil 146 and also to the anode 137 through coupling condenser 138. The two cathodes of device 112 are interconnected and grounded for direct current through the high frequency choke coil 140 and serially connected resistance 143.

Space current for the anode 141 associated with grid 136 is supplied from the high voltage lead 120 through the serially connected resistances 144, 145. Space current for the other anode 137 is also supplied from the high voltage lead 120 but through the serially connected resistance 144, 148. The grid associated with anode 137 is grounded.

The resulting amplified signals are thus applied with opposite phase across the serially connected resistances 145, 148, the junction point of said resistance 145, 148 being connected to ground through condenser 151 and the opposite terminals of resistance 145, 148 being connected to ground respectively through the serial circuit comprising condenser 153 and variable inductance 154 and through the serial circuit comprising condenser 156 and variable inductance 157.

The crystal rectifiers 33, 34 have their common terminals connected to the grounded junction points of coils 154, 157 through condenser 160, the other terminals of rectifiers 33, 34 being connected respectively to the other terminals of coils 154, 157.

The connected negative terminals of rectifiers 33, 34 are connected to one terminal of resistance 164 in the cancellation network 38 through the wave trap 163 comprising a coil self-resonant at 15 megacycles so as to act as a filter.

As will be described in detail later, a similar signal from the undelayed channel 29 is applied to the resistance 165 which has one of its terminals interconnected with the terminal of resistance 164 at the junction point 38A. The voltage appearing at the junction point 38A of resistance 164, 165 is, after modification, applied to the intensity control electrode 53 (Figure 1) of the indicator 54.

Now that the delayed network is described in detail, a description of the undelayed channel 29 follows, but with less detail because of similarity of elements:

The undelayed channel 29 includes four amplifying stages 170, 171, 172, 173 feeding into a phase-splitting circuit 174. The amplifying stages 171, 172 and 173 are each identical and are connected in identical manner to the next succeeding to next preceding stage as are the stages 63 to 65 in the delayed channel 28. Since the circuitry of the amplifying stages 63, 65 is described hereinabove, it is considered unnecessary to describe the circuitry of the stages 171, 172 and 173 in detail. The same is true with respect to the phase splitting circuit 174 and full wave rectifying circuit 175 into which the stage 174 feeds. This is true since stage 174 and rectifier circuit 175 are identical respectively to the phase splitting circuit 112 and interconnected full wave rectifier, including rectifiers 33, 34 described in detail hereinabove.

The input stage 170 in the undelayed channel 29 may be considered to be equivalent to the input stages 61, 62 considered as a unit. It is noted that a compensating network similar to the compensating network 102, 103 and 105 in the delayed channel 28 is not provided in the undelayed channel 29, compensation being made entirely for attenuation introduced in the delay line in the delay channel 28 alone.

The undelayed channel 29 receives a signal of amplitude relatively large compared to the amplitude of the signal received by the delay channel 28. The input signal for channel 29 is developed across a potentiometer type of resistance 177 having one of its terminals grounded and the other one of its terminals connected to the ungrounded output terminal of MOPA 24 through a series resistance 178, the movable tap on the resistance 177 being connected to the control grid of device 170 through the serially connected resistance 179 and condenser 180.

Since the signal level in the input circuit of stage 170 is relatively high, a low noise input circuit of the type described in the delay channel 28 is not used. However, in order to equalize the gain variations in the two channels 28, 29, occasioned by filament voltage fluctuations, etc., approximately the same number of tubes is used in the channel 29 as in the delayed channel 28.

The control grid of device 170 is connected to the undelayed channel bias lead 182 through the serially connected resistance 183 and isolating resistance 184, the lead 182 being maintained substantially at ground potential for high frequency signals by the bypass condenser 185. The cathode of device 170 is connected to the junction point of resistance 183 and 184 through a parallel connected grid bias arrangement comprising shunt connected resistances 186 and condenser 187.

Space current for device 170 is supplied from the high voltage lead 120 which is connected to the anode of device 170 through serially connected resistances 189, 190 and 191, the junction point of resistance 190 and 191 being connected to the screen grid of device 170, which screen grid is maintained substantially at cathode potential for high frequency signals by the bypass condenser 192.

Amplified signals appearing on the anode of device 170 are applied to the control grid of device 171 through coupling condenser 194. Then after successive amplification in stages 171, 172 and 173, the resulting amplitude signal is split into two components, 180° out of phase, and applied to the full wave rectifier circuit 175 after which the rectified components are applied through the wave trap or filter element 195 to resistance 165 in the same manner as described above in connection with stages 65, 112 and the associated full wave rectifier including rectifiers 33, 34.

The voltages thus applied to the resistances 164, 165, respectively, from the delayed channel 28 and undelayed channel 29 are of opposite polarity; and, when such voltages are of equal amplitude, and occur simultaneously, the voltage across terminals 200 and 201 of the cancellation network 38 is zero and also the junction point 38A is at zero potential with respect to ground.

In order to effect such a balance of the output voltages from the two rectifiers associated respectively with the channels 28, 29 in the cancellation network 38, the signal level at the input to the undelayed channel 29 may be varied by varying the position of the tap on the potentiometer type of resistance 177. This resistance 177, which may be in the order of 100-ohms, in conjunction with the resistance 178, which may be in the order of 1500 ohms, forms an attenuating voltage divider.

The cancellation network 38 comprises the two identical resistances 164, 165 and the two parallel resonant radio frequency filter inductances 163 and 195. The two self-resonant inductances 163, 195 isolate the cancellation network from the radio frequency components of the detector or rectifier output.

It is noted that although the crystal detectors 35, 36 are connected in an identical rectifying circuit as are the crystals 33, 34, the polarities of crystals 35, 36 are opposite to the polarities of the crystals 33, 34.

Hence, similar video signals from each detector when presented to the cancellation network at the same time results in a zero voltage potential at the junction point of the two resistances 164, 165, since the polarity of the voltages across these resistances are reversed. The detector associated with the delay channel 28 may therefore be characterized as the plus detector and the detector associated with the undelayed channel may be characterized as the minus-detector. Any simultaneous video signals which are constant in character and amplitude are cancelled effectively to zero at the cancellation network, whereas signals of unequal or varying amplitude and polarity will occur in the cancellation network with a difference other than zero. It is this difference which constitutes the bipolar video output.

In accordance with an important aspect of the present invention the relative gains of the delayed and undelayed channel amplifiers 28, 29 are controlled either automatically or manually such that the over-all gains of these two signal channels 28, 29 are the same. This is for the purpose of canceling nonchanging signals with precision. In the event that nonchanging signals are not canceled completely, their resultant produces an effect, either on a cathode ray tube or in a controlled mechanism, the same as would be produced by a moving target.

By controlling the over-all gains of the two signal channels simultaneously and with relationship to one another the nonchanging signals from the delayed and undelayed channels have the same amplitude in the input circuit to the subtraction or cancellation circuit 38. Not only is it desirable that the signals from each one of the channels 28, 29 have the same amplitude at the input to the cancellation circuit but, preferably, they should also have the same shape. The shapes of the two signals from the channels 28, 29 are substantially the same if the over-all frequency response of each signal channel 28, 29 is the same, and if both amplifier channels 28, 29 are operated linearly.

Therefore, it is desirable that not only should the relative gains in the two amplifier channels 28, 29 be controlled one with respect to the other but also in controlling their amplification due regard should be had to obtain equal frequency response in each channel, even though the gain of one channel may be varied with respect to the other channel.

This problem is complicated somewhat by the fact that the delay line 31 produces an attenuation of approximately 70–80 decibels in the signal passing therethrough and also introduces frequency distortion. This requires the gain of the delayed channel 28 to be considerably greater than the gain produced in the undelayed channel 29. Furthermore, the delay line 31 affects the frequency response of channel 28 only and a compensatory effect is introduced in the delayed channel 28 to correct this condition. This compensatory effect, as described hereinabove, is accomplished by the compensation circuit 102, 103 in the delay channel.

The relative gain produced in the two channels 28, 29 is controlled by an automatic gain control circuit 40 shown in block diagram in Figure 1, and in greater detail in Figure 2. Briefly, this automatic gain control circuit 40 includes two germanium crystals 210, 211 suitable filters, and a twin triode amplifying device, for example, of the R. C. A. type 6SL7. This gain control circuit may be controlled either manually or automatically by first setting the position of double-pole, double-throw switch 213.

Referring to Figure 2, the purpose of the automatic gain control circuit 40 is to control simultaneously and in predetermined fashion the potentials on the leads 68 and 182, respectively, for controlling the amplification discharge devices 61 and 170 in corresponding channels 28, 29, the devices 61, 170 being of the so-called variable mu type and preferably of the 6AK5 type. In the manual position of switch 213 these leads 68, 182 are connected, respectively, to the movable taps of the shunt-connected potentiometers 215, 216, one terminal of which is grounded and the other terminal of which is connected through a resistance network 219 to a lead 220 which has a negative potential in the order of 150 volts. By varying the position of the taps on resistances 215, 216, the gains in the corresponding amplifying channels 28, 29 may be controlled. These taps are adjusted so that the average carrier level of signals at corresponding points in the output of such channels are substantially constant to assure complete cancellation of signals from stationary targets.

While this desirable result may be obtained by manually changing the position of the taps on resistances 215, 216, the same result, preferably, is obtained automatically by using the discharge device 222.

When switch 213 is in its automatic position, as shown in Figure 2, lead 68 is connected to one of the anodes of the twin triodes 222, while the other lead 182 is simultaneously connected to the other anode in twin triode 222, space current for such anodes being obtained from the lead 120 of positive potential through individual corresponding serially connected resistances 224, 225. The corresponding cathodes for these anodes are connected to lead 227 through individual variable resistances 228, 229, the lead 227 being effectively grounded for high-frequency signals through bypass condenser 230. Also, lead 227 is connected to lead 220 to provide a connection for the flow of space current through the two different sections of device 222.

It is apparent that the continuous potential of leads 68, 182 may be controlled by controlling the potential of the respective interconnected anodes in device 222. The potential of these anodes is correspondingly controlled by controlling the flow of space current through the device 222. Such flow of space current is controlled by the potential of the corresponding main control electrode. The main control electrode 232 associated with the channel 28 is coupled through coupling condenser 234 to the anode 141 in device 112. Correspondingly, the main control electrode 235 associated with the channel 29 is coupled to the corresponding anode in device 174 through couplng condenser 237.

In such case, the grids 232, 235 are made sensitive to the potential of amplified signals in the individual channels 28, 29. A portion of such amplified signals from channels 28, 29 is first rectified by corresponding rectifiers 210, 211, the rectified components then filtered and applied to the corresponding grids 232, 235 to control the potential of the corresponding leads 68, 182.

The rectifying and filtered circuit associated with grid 232 is hereinafter described in detail, it being understood that there are corresponding identical circuits associated with the other control grid 235.

The high-frequency voltage coupled by condenser 234 appears largely across the inductance coil 240, one terminal of the inductance coil being connected to the lead 227 and the other terminal being connected to the positive terminal of rectifier 210. The negative terminal of rectifier 210 is connected to a loading resistance 242 through a filter choke coil 243, the other terminal of resistance 242 being connected to lead 227 to provide a path for the flow of continuous current. Filter condenser 244 may be connected between the lead 227 and the junction point of rectifier 210 and coil 243. The continuous voltage appearing across resistance 242 is applied to the grid 232 through a filter network comprising resistance 245 and condenser 246. The resistance 245 is serially connected between the grid 232 and coil 243, while the filter condenser 246 is connected between lead 227 and the grid 232.

It is apparent from the circuit thus far described that when the amplified signal in the output of channel 28 tends to increase, the amplitude of the rectified direct current across resistance 242 also increases such that the space current through device 222 tends to increase. Such increased space current produces a higher voltage drop across resistance 224 to lower the potential of the connected anode to which the gain control lead 68 is also connected. This decrease in potential of lead 68 causes a decrease in the amplification factor of device 61 so as to decrease the over-all amplification factor in channel 28 to thereby produce a reduction in amplified voltage output which originally produced the relatively high direct current potential to appear across resistance 242.

Correspondingly, an increase in amplified voltage appearing at the output of channel 29 causes the over-all amplification factor of channel 29 to decrease to thereby maintain substantially constant amplification in the channel.

Furthermore, the relative amounts of amplification in channels 28, 29 may be varied by varying resistances 228, 229 since their values affect the amount of space current flowing in the different sections of the device 222. The controls for resistances 228, 229 may be "ganged" such that an increase in one of the resistances is accompanied by a corresponding decrease in the other one of the resistances as the attached ganging control element is moved.

When the gain control circuit 40 is thus adjusted so that the average carrier level of signals in the channels 28, 29 are at the same level, the signals from stationary targets are canceled in the cancellation network 38 and the junction point 38A of the resistances 164, 165 is at zero potential with respect to ground. The potential of this junction point 38A has positive and negative values occasioned by reflections from a moving target. In other words, the video signals produced at the output of the cancellation network 38 occasioned by moving targets, are bipolar in nature and may have an extremely wide range of amplitude. Because of this wide range of amplitude, preferably special circuits are used in the video amplifier 43 which follows.

The junction point 38A is coupled to the main control grid of device 250 through the coupling condenser 251. Bias voltage is applied to such control grid from the negative lead 220 which is connected to ground through the fixed resistance 252 and potentiometer type of resistance 253 whose tap is connected to such grid through serially connected resistances 254, 255. The junction point of resistances 254, 255 is effectively grounded for high-frequencies by the condenser 256. The resistance capacitance network, including elements 254, 255 and 256 thus provides a short time constant network between the cancellation network 38 and the amplifier stage 250. This time constant network is desirable since it serves the purpose of reducing the deteriorating effect which the flow of grid current in device 250 may otherwise have on positive peaks of large amplitude signals. This network also materially reduces the effect of clouds and CW (continuous wave) jamming signals, when present.

Gain of the bipolar video amplifier 250 may be controlled by varying the grid bias of the variable mu tube 250 by varying the position of the tap on the resistance 253. Little nonlinearity is introduced here because most of the video present is at a low level compared to signals in the following stages.

In order to accommodate large amplitude bipolar video signals in the second stage 260 without incurring the risk of grid current deterioration of video, a direct-current coupling path is used between the stages 250 and 260. For this purpose, the anode of device 250 is connected directly to the control grid of device 260. To establish the proper voltage relationships in the direct-current coupled stage 260, that is, to keep the average grid voltage of the second stage 260 negative with respect to the cathode a sufficiently large value of cathode resistance consisting of resistances 261, 262, 263 in parallel is used in stage 260, these shunt-connected resistances being shunt connected to the bypass condenser 264. The cathode of device 260 thus operates at a potential of approximately 85 volts above ground.

Space current for device 250 is supplied from the high positive potential lead 265 through the device 266 having its twin elements connected in parallel and through the serially connected choke coil 267 and resistance 268. The purpose of the device 266 serves as a voltage dropping resistance to bring the anode supply voltage of 250 volts down to 80 volts at the anode of device 250 and the connected grid of device 260. Space current for device 260 is supplied from lead 265 through resistance 270, inductance coil 271 and resistance 272.

The amplified bipolar signals present on the anode of device 260 is applied to the first control grid of the twin triode device 274 through a coupling condenser 273. The device 274 serves as a phase splitter arranged to drive a full wave crystal rectifier circuit referred to as the final detector and includes the rectifier elements 47, 48.

The two germanium crystals 47, 48 are arranged in a full wave rectifier circuit, which responds to the push-pull bipolar video signals on the anodes of device 274 and produces unipolar or unidirectional video on the grid of device 49. This final detector is not a detector in the usual sense of demodulating an R. F. carrier, but serves as a rectifier to convert bipolar video signals to unipolar video or video of single polarity. The final detector is followed by a single 6AK5 video-amplifier stage 49, which drives a 6J6 cathode-follower output stage 50.

The M. T. I.-cancelled video output of the cathode follower 50 is sent to the video selector 52 so that it may be used on the screen of the search indicator or may be used to effect a control operation.

The video selector 52 in Figure 1 is adapted to accept normal video from the M. T. I. receiver, M. T. I. cancelled video from the comparison amplifier, and trigger from the A. T. C. unit. It may deliver range-gated video to the video amplifier of a search indicator. Range-gated video consists of M. T. I. video extending out to a certain range, but with normal video beyond that range.

The video selector 52 is adapted to feed either M. T. I. or normal video signals for presentation upon the search indicator, or may gate the presentation of both, or may allow for mixing of a proportion of normal video with M. T. I. video.

As indicated above, in order to make possible cancellation of unchanging video signals in the cancellation circuit 38, corresponding echoes must be presented to this circuit at precisely the same time. This simultaneity is known as temporal cancellation. The automatic-temporal-cancellation (A. T. C.) unit makes possible the realization of temporal cancellation over long periods of time by making the frequency of the master, or system, trigger dependent upon the variations in delay encountered in the delay line. If the temperature changes of the line are such as to increase the delay, tending to spoil temporal cancellation, the frequency of the master oscillator is lowered a corresponding amount so that the repetition interval is equal to the delay interval.

Thus, the automatic temporal cancellation control described in greater detail hereinbelow supplies the search system trigger, and continuously corrects the pulse recurrence frequency to compensate for changes in the amount of delay present in the delay line.

Synchronization requirements in the M. T. I. system are more exacting than in a system not incorporating M. T. I. It is apparent that any significant jitter in the pulse repetition rate for M. T. I. would be intolerable since such jitter would cause the signals from the delayed and undelayed channels to reach the subtraction circuit with imperfect temporal cancellation. Because one-half microsecond pulses are used in the system, the allowable jitter must be relatively small. Preferably, the jitter in the M. T. I. system should be less than $\frac{1}{200}$ microsecond for good cancellation of stationary targets.

As indicated hereinabove, a tracking pulse 356 is generated in the A. T. C. unit and is transferred through MOPA 24, through the delay line 31 and delayed amplifier 28 and is returned to the A. T. C. unit for time comparison after being detected at the rectifier 45A.

The specific circuit arrangement for detecting the tracking pulse at 45A is shown in detail in Figure 2 wherein a portion of the amplified output from the delay channel 28 appears across the resistance 143 as described hereinabove.

The voltage appearing across resistance 143 is applied to the coil 302 which is self-resonant at 15 megacycles per second through the condenser 303. This voltage applied to coil 302 is rectified in the detector 45A and is filtered by the coil 304 and condenser 305 so that substantially all of the demodulated tracking pulse appears across the resistance 306.

The demodulated tracking pulse is then applied to the cathode follower stage 46A whose output is connected to the tracking pulse amplifier 47A in the A. T. C. unit, after which it is applied to the cathode follower stage 48A and then applied to the coincidence circuit 49A for comparison with an early gate and a late gate developed in the A. T. C. unit from the oscillator 300 and associated network which is described now in detail with reference to Figures 1 and 3.

The timing oscillator 300 is preferably a simple stable low frequency oscillator capable of accepting a small unidirectional error voltage to change its frequency. For this purpose, the oscillator 300 is a resistance capacitance type of phase shift oscillator producing a sine wave output at 2,000 cycles per second.

The error voltage is applied to the main control grid of the oscillator tube or stage through a resistor 310 in the feed-back circuit of the oscillator. The frequency of the oscillator stage 300 may be varied by adjusting the values of the resistance and capacity components, for example, by varying the position of the movable tap on resistance 311; and further, such frequency may also be varied over a small range by changes in such unidirectional error voltage applied to the grid of tube 300 through the single pole, double throw switch 312.

The main control grid 313 swings positive over a portion of a frequency cycle and the total time during which the grid is positive to produce grid current during one cycle is determined, of course, by the polarity of the grid. When the grid becomes positive, the dynamic control grid resistance produces a grid current flow through resistance 310, or, in other words, the phase shift feedback network in the oscillator stage 300 is loaded. Such loading, in turn, determines the phase shift characteristic of the feed-back circuit to thereby determine the frequency of oscillations generated in the oscillator stage 300. Thus, the oscillator stage 300 is arranged to accept corrective information in the form of a unidirectional error voltage applied to lead 314 to alter its frequency in accordance with the information received.

The oscillator stage 300 feeds a cathode follower buffer stage 316, which in turn feeds a regenerative pickoff or trigger circuit comprising the pulse transformer 317, clamper or regenerative pickoff diode 318, and regenerative pickoff tube 319. This regenerative trigger generating circuit produces a sharp trigger or timing pulse 320 which is used to drive the tracking pulse generator and the gating circuits included in the coincidence circuit 49A. The function of such trigger generating circuit is to provide a stable trigger at the proper repetition interval which corresponds to the signal transit time in the signal line.

This regenerative trigger generating circuit, including the pulse transformer 317, generates a virtually jitter-free timing pulse 320 having the same frequency as the frequency of oscillations generated by the oscillator 300. This pulse 320 is used to drive another cathode follower buffer stage 321 which couples the timing pulse 320 through the artificial transmission or delay line 322 to the tracking pulse generator, driving oscillator stage 323 whose output in the form of a tracking pulse is transferred through the attenuator 42A (Fig. 1) and thence to the input of MOPA 24 for transmission down the delay line 31 in the form of a modulation component of a 15 megacycle carrier generated in MOPA.

Also, the output of buffer stage 321 in the form of a pulse 320 is applied in turn to the early gate generator 325, comprising oscillator 326 which produces an early gate 327 approximately one microsecond in duration. The trailing edge of the early gate 327, through buffer stage 330A, in turn triggers the late gate generator 330, comprising oscillator 329 which produces another one microsecond gate 331 known as the late gate.

Thus, the timing pulse 320 initiates an early gate 327 and the back edge of the early gate initiates a late gate 331. These two early and late gates are each about one microsecond in length and both feed into the coincidence circuit 49A.

The output of the late gate generator 330 is then applied through the cathode follower stage 333 and drives the blocking oscillator or trigger generator stage 334, the output of which goes to the search system through the cathode follower stage 335. The late gate 331 thus serves as a master trigger for the synchronizer 340 in the search system.

The early and late gate 327, 331, occurring one microsecond apart, are applied to the coincidence circuit 49A comprising the pulse transformer 342 and tubes connected 343, 344. These early and late gates are applied as anode voltage for the coincidence tubes 343, 344, the early gate 327 being applied to the anode of the tube 343 and the late-gate 331 being applied to the anode of tube 344.

In the meantime, as mentioned above, the tracking pulse output from tube 323 meanwhile has gone to the input of MOPA 24 and has been sent through the delay line 31 on the 15 megacycle carrier generated in MOPA. This tracking pulse emerges from the delay line and connected delay amplifier and is demodulated by the detector 45A. This tracking pulse, after demodulation, is then amplified by the four stage tracking pulse amplifier 47A comprising tubes 350, 351, 352 and 353. After amplification in the four stage amplifier 47A, the tracking pulse 35 is applied to the coincidence circuit 49A through transformer 342 after having been subjected to the delay variations in the 1,000 microsecond mercury delay line 31.

When the delayed tracking pulse 356 lies symmetrically in the space between the early gate 327 and the late gate 331, as shown in Figure 1, the continuous voltage developed in the coincidence circuit 49A is of a predetermined magnitude and is applied to lead 314 through switch 312. So long as the voltage has such predetermined magnitude, the frequency of oscillations generated in the resistance capacitance oscillator 300 remains the same. Such voltage changes however, when the tracking pulse 356 is closer to one of the gates 327, 331 than the other. This change in voltage applied to lead 314 causes the frequency of oscillations generated in the oscillator 300 to change in such a direction so as to space the tracking pulse 356 equally between the early and late gates 327, 331.

Thus, a change in the continuous potential applied to lead 314 resulting from the tracking pulse 356 lying more in one gate than the other results in a continuous voltage applied to the timing oscillator 300 so as to changes its frequency in such a direction as to correct the trigger timing error. Specifically, the error voltage applied to the oscillator 300 through lead 314 results from the negative charge on the condenser 360 in the coincidence circuit 49. The magnitude of the charge in condenser 360 is dependent upon the conduction of tube 343 and tube 344, since an increase in conduction of one of the tubes 343, 344 increases the voltage across the terminals of condenser 360 and conversely such voltage is decreased when the other one of said tubes becomes more conductive.

In order to effect coincidence of the tracking pulse 356 in time with the center of the early and late gate 327, 331, it is desired to add a small additional delay in series with the tracking pulse 356 in the order of one-half the width of the early gate 327. This delay is in the order of one-half the width of the early gate 327. This delay is thus in the order of one-half microsecond and may be varied to obtain good temporal cancellation by varying the position of the seven position switch 362.

It is noted that the oscillator stage 300 operates at a normal frequency of 2,00 cycles per second and that the time pulse interval is in the order of 500 microseconds, and the delay of the mercury delay line 331 is in the order of 1000 microseconds. This means that a given tracking pulse 356 arrives at the coincidence circuit 49A along with the early and late gates occurring two timing pulses late rather than with the gates 327, 331 occurring on the next timing pulse. Operation of the circuit is thus the same as if the delay were 500 microseconds, except that there are always two tracking pulses in the delay line 31, 500 microseconds apart, with a video train following every other tracking pulse.

Video signals occurring in the tracking pulse detector 45A of the comparison amplifier are thus of substantially no consequence, provided that such signals do not arrive at the coincidence circuit 49 of the automatic temporal control unit at the times when the early and late gates 327, 331 are supplying anode voltage to tubes 343, 344.

To ensure that neither receiver noise nor video signals from strong distant targets, for example, targets at 45 miles, will be superimposed on the tracking pulse 356, the COHO gate generator 13B is supplied with trigger pulses from the cathode follower stage 335 and the buffer stage 13C is adjusted so that the M. T. I. receiver is switched off at some time later than 350 microseconds after the main pulse is transmitted from antenna 9 to thereby allow detection of moving targets in the normal range of 30 miles. This time is greater than 350 seconds and is preferably shorter than the time required before the occurrence of the tracking pulse. The time occurrence of the tracking pulse is approximately 475 microseconds corresponding to a distance of approximately 45 miles.

It is noted further that before the trigger generating system, including the stages 317, 318 and 319 may operate automatically, the tracking pulse 356 should be of sufficient amplitude to cause the switch tubes 343, 344 of the coincidence circuit 49 to open at the proper time. It is noted that the amplitude of this tracking pulse depends on the gain control settings in the MOPA unit 24, as well as the settings of the gain controls in the delayed channel 28 of the comparison amplifier. Therefore, these controls should initially be set for proper range, then the potentiometer resistance 177 may be adjusted to substantially its full gain position. As noted previously, resistance 177 controls the continuous potential on the automatic gain control lead 182 of the undelayed channel 29.

The tracking pulse may be initially locked in with the early and late gates by varying the frequency of oscillations generated in oscillator 300 over an extended range of frequencies. This may be accomplished by momentarily discharging the one microfarad error voltage condenser 360 in the coincidence circuit 49 and then allowing such condenser to charge through the coincidence circuit and associated resistors. This method of locking-in is very positive and may be checked by varying the potentiometer type of resistance 311 in the phase shift circuit of the oscillator 300 and noting whether the continuous error voltage across the one microfarad condenser varies accordingly.

The modified arrangement described in relationship to Figures 4–7, both inclusive, utilizes an elongated tracking pulse 400 developed in the automatic temporal cancellation unit for obtaining automatic amplitude cancellation.

In understanding this modified circuit, it is noted that in a moving target indicator (M. T. I.) cancellation system as described above, there is first temporal cancellation before amplitude cancellation takes place, i. e., the two pulses to be cancelled have the proper time relationship before the results of amplitude cancellation (subtraction or addition) are observed. On the other hand, it is not necessary to have amplitude cancellation before temporal cancellation occurs, since it is observed that the takeoff point for the timing circuits is ahead of the subtraction circuit or cancellation network 38 in the comparison amplifier 30 (Figure 1). Also, it is noted that the tracking pulse for the timing circuit, i. e., the A. T. C. unit, is taken from the output of the delayed channel 28 in order that the A. T. C. unit may produce compensatory effects for changes of relay in the mercury delay line 31. For this reason, it is preferred to apply the atuomatic amplitude cancellation bias voltage, as developed in the modified arrangement, to the undelayed channel 29 only, a channel which is substantially completely independent of the automatic temporal cancellation loop. It is realized, however, that such automatic amplitude cancellation bias voltage as developed in the modified arrangement may, instead of being applied to the undelayed channel, be applied to the delayed channel 28, to produce automatic gain control in the delayed channel 28 instead of in the undelayed channel 29.

The operation of the modified arrangement shown in Figures 4–7, both inclusive, depends on the use of an elongated tracking pulse 400 as shown in Figure 5, having a time duration of, for example, 5 microseconds with related spaced 1-microsecond early and late gates 401 and 402 which, in the coincident condition overlap the leading and trailing edges of the elongated tracking pulse 400. That portion of the tracking pulse not overlapped by the early and late gates is effectively used in controlling the gain of one of the channels 28, 29 in the comparison amplifier.

In operation of this modified arrangement, the front and back edges of the tracking pulse 400 should be sharp and have rise and fall times which are short compared with one-half a microsecond. The front and back edge of the tracking pulse should also have extremely small "time jitter" with respect to the early gate and late gate.

With respect to Figure 4, it is observed that the modified A. T. C. unit shown therein has marked similarity to the A. T. C. unit shown in Figure 1; however, comparing Figures 1 and 4, a 5-microsecond pulse generator 323A in Figure 4 is used instead of the sharp pulse generator circuit 323 in Figure 1; and further, a 5-microsecond delay network 405 in Figure 4 is interposed between the early gate generator 325A and the late generator 330A, which gate generators correspond respectively with the early gate generator 325 and the late gate generator 330 in Figure 1.

A further significant change in Figures 1 and 4 is that whereas in Figure 1 the output of the tracking pulse generator 323 is applied exclusively to MOPA 24, for purposes of modulating a 15 megacycle carrier wave generated therein, in Figure 4, besides being applied in like manner to MOPA 24, the elongated tracking pulse 400 is applied also to the automatic amplitude cancellation unit and specifically to a 3-microsecond gate generator 407 for gating a signal selection circuit 408.

The video output of the subtraction circuit in the comparison amplifier is first amplified by a high gain video amplifier 409, and a portion of such video is selected, i. e., "sampled," in the signal selection circuit 408 upon initiation of the 3-microsecond gating voltages developed in the gate generator 407. It should be carefully observed that such period of 3-microseconds corresponds to that portion of the elongated tracking pulse 400 which is not overlapped by the early and late gates 401 and 402 when temporal cancellation occurs. The signal thus selected or "sampled" in the selection circuit 408 is then applied to the pulse stretching circuit and filtering network 410 which is essentially an integrating circuit, and the output of such circuit 410 is applied preferably to the undelayed channel 29 of the comparison amplifier or, as mentioned above, may be applied to the delayed channel amplifier 28 as a compensating bias for correspondingly varying either the gain of the first amplifier tube 170 (Figure 2) in the undelayed channel or the gain of the first tube 61 (Figure 2) in the delayed channel. By this expedient, the gain in the delayed or undelayed channels, as the case may be, is automatically adjusted to condition the comparison amplifier for proper automatic amplitude cancellation in the cancellation network. Details of some of the new circuits used in the modified arrangement shown in Figure 4 are described in relationship to Figures 6 and 7.

With respect to Figure 6, which shows details of the 5-microsecond pulse generator 323A, the width of the gating voltages 400 generated by the multivibrator stage as a result of triggers 320 may be adjusted by adjusting the tap on the resistance 412. The trigger 320 is applied to the control grid of the tube 414 which has its control grid connected to ground through the resistance 415 and its cathode connected to ground through the biasing arrangement which comprises the parallel connected resistance 416 and condenser 417 combination, the anode of tube 414 being connected to the positive terminal of the voltage source 418 through the resistance 419. It is noted that this resistance 419 is likewise connected to the anode of the next succeeding tube 420 so that the potential on such anode is determined by the amount of space current being supplied to the first tube 414. It is noted that the cathode of the first tube is connected to the positive terminal of source 418 through resistance 422 so that the cathode 423 is maintained at a relatively high positive potential with respect to its associated control grid, whereby, in the quiescent state, i. e., in the absence of a trigger 320, the tube 414 is normally nonconducting. However, upon the occurrence of a positive trigger 320 to the control grid, a relatively large current flows through the first tube 414 to cause the voltage at its anode to be depressed, and this results in the initiation of the negative going edge of the gating voltage 424. This change in the potential of the anode results in charging of the condenser 425, the discharge rate of which is controlled by the position of the tap on the variable resistance 412, which is connected between the grid and cathode of the third tube 427. The condenser 425 is connected between the anode 428 and the control grid 429, and the cathode of the second tube 420 is connected to the cathode of the third tube and grounded through a common resistance 430. The control grid for the second tube is grounded.

The negative voltage thus transferred to the control grid of the third tube 427 results in a reduced current flow through the third tube in the following path which comprises: The battery 418, the resistance 432, the third tube 427 and the resistance 430. Such decreased current flow through resistance 430 causes a still greater current flow through the tube 428 to tend to further maintain the potential at its anode depressed. Subsequently, however, after the charge on the condenser 425, discharging through the adjustable resistance 412, falls below a predetermined magnitude, the third tube 427 is rendered fully conducting again to cause the potential on its anode to be depressed, thus producing the negative going edge of the positive gating voltage 400. Such positive gating voltage is applied from the anode through condenser 435 to the control grid of the cathode follower tube 438, which has its cathode output resistance 439 connected to supply positive 5-microsecond tracking pulses to the attenuator 42A.

The 3-microsecond gate generator 407 shown in block diagram in Figure 4 may be of the form previously described in connection with Figure 6, and its output is supplied to the signal selection circuit shown in detail in Figure 7.

With reference to Figure 7, bi-polar video signals, i. e., either positive or negative video signals, as the case may be, from the cancellation network 38 are applied through the coupling condenser 440 to the cathode 441 of the cathode follower tube 442 which has its anode connected to the positive terminal of voltage source 443, and its cathode 441 connected to the negative terminal of source 444 through the fixed resistance 445 and variable resistance 446, which has its variable tap connected through resistance 447 to the control grid. The tubes 450 and 451 are connected as switch tubes to accept either positive or negative video which may appear at the cathode of the cathode follower tube 442 at the time of appearance of the 3-microsecond pulse which is applied to the transformer primary winding 455 from the gate generator 407 in Figure 4. For this purpose, the anode of tube 450 is connected to the cathode of the other tube 451; and the cathode of such first tube 450 is connected to the anode of the second tube 451. The control grid of the first switch tube 450 is connected through resistance 453 to its cathode, and likewise to one terminal of the secondary transformer winding 457, the other terminal of such winding being connected through condenser 458 to the control grid of the first tube 450. In similar manner, the control grid of the second tube 451 is connected through resistance 460 to its cathode as well as to one terminal of the secondary transformer winding 462, the other terminal of such winding 462 being connected to the control grid through the condenser 463.

The connected cathode and anode of tubes 450 and 451 are connected to the ungrounded terminal of the condenser 466 which, under changing conditions, is charged differently upon successive applications of the gating pulse 467 to the primary winding. The voltage thus developed across condenser 466 is applied to the control grid of the cathode follower tube 470 through the filtering network which comprises the serially connected resistance 471 and the shunt connected capacitor 472. The anode of the cathode follower tube is connected to the positive terminal of the voltage source 443, and its cathode is connected to the negative terminal of source 474 through the adjustable resistance 475 which has its adjustable tap connected through the serially connected filtering and isolating resistances 477 and 478 to the A. G. C. line, which is connected to the control grid of the first tube in either the undelayed or delayed channel 28, 29. A filtering condenser 480 has its ungrounded terminal connected to the junction point of the resistances 477 and 478.

Thus the tubes 450 and 451 are connected such that they act as a switch tube capable of conducting in either direction. A charge is either added to or taken away from the condenser 466, depending upon the polarity and intensity of the signal appearing at the cathode 441 at the time of application of the 3-microsecond gating voltage to the primary winding 455. This switching circuit comprising the tubes 450 and 451 is opened by the 3-microsecond pulse which passes through the pulse transformer, which includes the winding 455 and is of such amplitude to drive the grids of the tubes 450 and 451 positive. If the cathode 441 is higher (more positive than the grid of the tube 470 at the time of this instantaneous switch action) conduction takes place through tube 450 and the condenser assumes a new charge. Similarly, conduction takes place through the tube 451 if the instantaneous voltage at the cathode 441 of the cathode follower tube is negative with respect to voltage on the grid of the tube 470.

The time constants of the circuits comprising, on the one hand 453, 458 and, on the other hand 460, 463, are long enough to maintain the grids of the associated first and second tubes 450 and 451, respectively, negative during the interval between the 3-microsecond pulses. It is observed that the coupling from the grid of the first cathode follower tube 442 to the cathode of the second cathode follower tube 470 is conductive in nature, i. e., a D. C. coupling, thus levels must be set up in such a way that the output voltage of the cathode of the second cathode follower is capable of acting as a grid bias voltage to control the gain of the several stages in the delayed or undelayed channel, as the case may be.

Preferably, the pulse transformer, which includes primary winding 455, is such as to pass 3-microsecond flat-top pulses occurring at a repetition rate of 2,000 pulses per second. Also, preferably, the time constants of the circuits comprising 453, 458; 460, 463 and 455A, 455B should be at least ten times the interpulse period.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a moving target indicating system of the character described wherein it is desired to eliminate indications produced by fixed targets, the improvement which resides in providing means for passing a train of video signals through a delayed channel amplifier, means for passing the same train of video signals through an undelayed channel amplifier, a cancellation network coupled to said delayed and undelayed channel amplifiers for developing a resultant voltage in said network which is equal to the difference in voltage appearing in said channel amplifiers, indicating means responsive to the output from said cancellation network, means deriving a control voltage in accordance with the intensity of a signal in one of said channels, and means automatically controlling the gain in said one channel in accordance with said control voltage.

2. In a system of the character described, a transmitter, an antenna coupled to said transmitter, means for keying the operation of said transmitter, a receiver coupled to said antenna to receive transmitted energy in the form of echo signals, a modulator stage coupled to said receiver and modulated in accordance with said echo signals, a delay network, a first channel including said delay network, coupled to said modulator, a second channel coupled to said modulator stage, detecting means in said first and second channels, a cancellation network connected between the detector in the first and second channels, an indicator coupled to said cancellation network and producing indications in response to the difference in voltages applied thereto from said first and second channels respectively, a timing unit including a variable frequency oscillation network, a wave shaping network coupled to said oscillation network to derive a series of substantially peaked pulses therefrom in timed relationship to the frequency of oscillations generated in said oscillation network, an early gating voltage generator coupled to said oscillation network for initiating an early gating voltage, a late gating voltage generator coupled to said early gating voltage generator for deriving therefrom a late gating voltage, means coupling said oscillation network to said keying means for operating said transmitter in timed relationship with the frequency of oscillations generated in said oscillation network, a coincidence circuit coupled to both said early gate and late gate voltage generators, means coupling said modulator stage to said oscillation network to produce a carrier voltage modulated in accordance with voltages derived from said oscillation network in the form of a timing pulse, means transmitting said timing pulse through said delay network in said first channel and to said coincidence circuit, and means coupled to said coincidence circuit for automatically varying the frequency of oscillations in said oscillation network in accordance with the position of said timing pulse with respect to said early and late gating voltages.

3. In a system of the character described, a radio receiver, a delay network, a first channel including said delay network coupled to said receiver, a second channel coupled to said receiver, a cancellation network coupled between said first and second channels to produce a differential voltage which is a measure of the difference of the voltages appearing in said first and second channels, a source of pulses of variable frequency, means coupling said source to said delay line for transmitting a timing pulse therethrough, means deriving a control voltage representative of the difference in the repetition rate of said timing pulse and the time delay encountered by said timing pulse traveling through said delay line, and means controlling the gain in at least one of said channels in accordance with said control voltage.

4. In a system of the character described, an antenna system, a transmitter coupled to said antenna system, means keying the operation of said transmitter, a radio receiver coupled to said antenna system for receiving energy in the form of echo signals produced as a result of reflected energy transmitted by said transmitter, a delay network, a first channel amplifier serially connected with said delay network coupled to the output of said receiver, a second channel amplifier coupled to the output of said receiver, a cancellation network connected between said first and second channel amplifiers to derive a differential voltage which is equal to the difference in voltages appearing at said first and second channel amplifiers, indicating means, means coupling said cancellation network to said indicating means, a variable frequency oscillation network coupled to said keying means for operating the same, means deriving a timing pulse from said oscillation network, means coupling said oscillation network to one of said channel amplifiers to transmit a timing pulse therethrough, and means controlling the frequency of oscillations generated in said oscillation network in accordance with the time required for said timing pulse to travel through said one channel amplifier.

5. In a system of the character described, the subcombination comprising: a radio receiver, a delay network, a first channel amplifier serially connected with said delay network and coupled to said receiver, a second channel amplifier coupled to said receiver, means coupling said first and second channel amplifiers to derive a differential voltage which is a measure of the difference in voltages appearing in said first and second channel amplifiers, a utilization device, and means impressing said differential voltage on said utilization device, means coupled to said channel amplifiers for deriving a continuous differential control voltage in accordance with the intensity of the signals in said channel amplifiers, and means controlling the gain in one of said channel amplifiers in accordance with said differential continuous control voltage.

6. In a system of the character described, a transmitter, an antenna system coupled to said transmitter, means for keying the operation of said transmitter to periodically deliver energy to said antenna system, means controlling the repetition rate of said keying means, a radio receiver receiving reflected energy in the form of echo signals, a delay network, a first channel amplifier, including said delay network, a second channel amplifier, means coupling said echo signals to said first and second channel amplifiers, a cancellation network interconnected between said first and second channel amplifiers to derive a differential control voltage which is a measure of the difference in voltages appearing in said first and second amplifiers, a utilization device, means impressing said differential control voltage on said utilization device, said repetition rate control means including a trigger voltage generator, means coupling said trigger voltage generator to said keying means to operate the same in accordance with trigger voltages generated in said trigger voltage generator, means impressing said trigger voltages on said delay network, means deriving from each trigger voltage a pair of time spaced control voltages, a coincidence circuit, means for impressing said time spaced control voltages and said trigger voltage, after it passes through said delay network, on said coincidence circuit, said coincidence circuit including means for deriving a control voltage which varies in accordance with the relative spacing of said trigger voltages with respect to said time spaced voltages, and means automatically varying the repetition rate of said trigger generator in accordance with the last mentioned control voltage.

7. In a system of the character described, a transmitter, an antenna coupled to said transmitter, means controlling the repetition rate at which said transmitter delivers energy to said antenna, a radio receiver receiving reflected energy in the form of echo signals, a delay network, said repetition rate controlling means including a trigger voltage generator for generating a series of trigger voltages of variable repetition rate, means coupling said trigger voltage generator to said delay network for transmission of trigger voltages therethrough, means controlling the repetition rate of said trigger voltage generator in accordance with the time required for trigger voltages to be transmitted through said delay network, a first channel including said delay network, a second channel, means coupling said receiver to said first and second channel, a differential network coupled between said first and second channel to produce a signal representative of the difference between said first and second channel, means in one of said channels for compensating for the frequency response of said delay network to render the frequency response of said first and second channels substantially the same, means deriving a control voltage in accordance with the intensity of signals passing through one of said channels, and means controlling the gain of one of said channels in accordance with said control voltage.

8. In a system of the character described, a transmitter, an antenna system coupled to said transmitter, means controlling the repetition rate at which energy is delivered to said antenna system from said transmitter, said repetition rate controlling means including a trigger voltage generator, a radio receiver receiving reflected energy in the form of echo signals, a delay network, a first channel amplifier including said delay network coupled to said receiver for transmission of said echo signals therethrough, a second channel amplifier coupled to said receiver for transmission of echo signals therethrough, means coupled to said first and second channel amplifiers for deriving a differential voltage which is a measure of the difference in instantaneous voltages appearing in said first and second channel amplifiers, a utilization device, means impressing said differential voltage on said utilization device, means automatically controlling the gain of at least one of said channel amplifiers in accordance with the intensity of the signals appearing in the output circuit thereof, means coupling the output of said trigger voltage generator to said transmitter for effecting operation of the same, means coupling said trigger voltage generator to said delay network, and means automatically varying the repetition rate of said trigger voltage generator in accordance with the time required for the trigger voltage to be transmitted through said delay network.

9. In a system of the character described, an antenna system, a transmitter coupled to said antenna system, means controlling the repetition rate at which energy is delivered from said transmitter to said antenna system, a receiver receiving reflected energy in the form of a train of echo signals, each signal corresponding to a differently located reflecting body, a delay network, a first channel amplifier serially connected with said delay network and coupled to said receiver, a second channel amplifier coupled to said receiver for transmission of said train of echo signals therethrough, said delay network being effective to delay the transmission of echo signals through said first channel amplifier for a period substantially equal to the repetition rate of said train of echo signals, said repetition rate controlling means including means for generating a voltage pulse, means for impressing said voltage pulse on one of said channel amplifiers for transmission therethrough, and means controlling the gain of one of said channel amplifiers in accordance with the amplitude of said pulse appearing in one of said channel amplifiers.

10. The arrangement set forth in claim 2 in which the gain of one of said channels is controlled in accordance with the intensity of the signal in said one channel.

11. The arrangement set forth in claim 2 in which the gain of one of said channels is controlled in accordance with the relative position of said timing pulse with respect to said early and late gating voltages.

12. The arrangement set forth in claim 4 in which the gain of one of said channel amplifiers is controlled in accordance with the intensity of a signal passing through said one channel amplifier.

13. The arrangement set forth in claim 4 in which means are provided for controlling the gain in one of said channel amplifiers in accordance with the time required for said timing pulse to travel through one of said channel amplifiers.

References Cited in the file of this patent

UNITED STATES PATENTS

| | | |
|---|---|---|
| 2,424,263 | Woodyard | July 22, 1947 |
| 2,523,283 | Dickson | Sept. 26, 1950 |
| 2,532,546 | Forbes | Dec. 5, 1950 |
| 2,538,027 | Mozley et al. | Jan. 16, 1951 |
| 2,540,827 | Mankin | Feb. 6, 1951 |
| 2,552,527 | Dean et al. | May 15, 1951 |
| 2,597,636 | Hall et al. | May 20, 1952 |